(12) United States Patent
Yu et al.

(10) Patent No.: US 10,569,789 B2
(45) Date of Patent: Feb. 25, 2020

(54) RAILWAY WAGON FOR TRANSPORTING TRUCKS AND METHOD FOR LOADING AND UNLOADING TRUCK

(71) Applicant: CRRC QIQIHAR ROLLING STOCK CO., LTD., Heilongjiang (CN)

(72) Inventors: Jiangang Yu, Beijing (CN); Shiying Zhang, Beijing (CN); Li Yin, Beijing (CN); Dongwei Han, Beijing (CN); Xun Yin, Beijing (CN); Zhong Zhang, Beijing (CN); Anguo Dai, Beijing (CN)

(73) Assignee: CRRC Qiqihar Rolling Stock Co., Ltd. (CN)

( * ) Notice: Subject to any disclaimer, the term of this patent is extended or adjusted under 35 U.S.C. 154(b) by 50 days.

(21) Appl. No.: 16/062,322

(22) PCT Filed: Dec. 2, 2016

(86) PCT No.: PCT/CN2016/108327
§ 371 (c)(1),
(2) Date: Jun. 14, 2018

(87) PCT Pub. No.: WO2017/101683
PCT Pub. Date: Jun. 22, 2017

(65) Prior Publication Data
US 2018/0370548 A1    Dec. 27, 2018

(30) Foreign Application Priority Data
Dec. 17, 2015    (CN) .......................... 2015 1 0954098

(51) Int. Cl.
*B60P 3/06*    (2006.01)
*B61D 3/18*    (2006.01)
(Continued)

(52) U.S. Cl.
CPC ................ *B61D 3/182* (2013.01); *B60P 3/06* (2013.01); *B60P 3/07* (2013.01); *B60P 3/08* (2013.01);
(Continued)

(58) Field of Classification Search
CPC ........ B61D 3/182; B61D 47/00; B61D 3/166; B61D 3/184; B61D 3/16; B61D 3/18;
(Continued)

(56) References Cited

U.S. PATENT DOCUMENTS

| 1,862,938 A | | 6/1932 | Nast | |
| 2,452,270 A | * | 10/1948 | Stuart | ...................... B60P 3/08 410/28.1 |

(Continued)

FOREIGN PATENT DOCUMENTS

| CN | 104386075 A | 3/2015 |
| CN | 204323346 U | 5/2015 |

(Continued)

*Primary Examiner* — Stephen T Gordon
(74) *Attorney, Agent, or Firm* — BakerHostetler

(57) ABSTRACT

Disclosed is a railway wagon for transporting trucks, including a middle running board device, end running board devices respectively arranged at two ends of the middle running board device, and a bridge board device arranged at the outer end of each end running board device. The middle running board device includes of multiple middle running board assemblies. Each middle running board assembly includes a running board connected to a side wall. At least one support plate connected to the side wall is arranged below the running board. Each end running board device includes multiple end running board assemblies. Each end running board assembly includes a running board connected to the side wall. At least one support plate connected to the side wall is arranged below the running board.

13 Claims, 4 Drawing Sheets

(51) Int. Cl.
    *B61D 47/00*     (2006.01)
    *B61D 3/16*     (2006.01)
    *B60P 3/07*     (2006.01)
    *B63B 25/00*     (2006.01)
    *B60P 3/08*     (2006.01)
(52) U.S. Cl.
    CPC ............... *B61D 3/16* (2013.01); *B61D 3/166* (2013.01); *B61D 3/18* (2013.01); *B61D 3/184* (2013.01); *B61D 3/188* (2013.01); *B61D 47/00* (2013.01); *B61D 47/005* (2013.01); *B63B 25/008* (2013.01)
(58) Field of Classification Search
    CPC ...... B61D 3/188; B61D 47/005; B61D 3/187; B60P 3/06; B60P 3/07; B60P 3/08; B63B 25/008
    USPC .......... 410/4, 6, 13, 17, 18, 24, 24.1, 26–28, 410/28.1, 29.1; 105/355, 370–372, 375, 105/458; 14/73, 73.1, 69.5, 6
    See application file for complete search history.

(56) References Cited

U.S. PATENT DOCUMENTS

| | | | |
|---|---|---|---|
| 5,032,044 A | 7/1991 | Dorst | |
| 6,447,226 B1* | 9/2002 | Andre | B60P 1/43 410/24 |
| 2008/0008552 A1* | 1/2008 | Boydstun | B60P 3/08 410/24 |
| 2008/0206009 A1* | 8/2008 | Forbes | B61D 3/02 410/26 |

FOREIGN PATENT DOCUMENTS

| | | |
|---|---|---|
| CN | 105480236 A | 4/2016 |
| CN | 205327063 U | 6/2016 |
| DE | 10104005 A1 | 8/2002 |
| GB | 1459360 A | 12/1976 |
| JP | H01269662 A | 10/1989 |

\* cited by examiner

RAILWAY WAGON FOR TRANSPORTING TRUCKS AND METHOD FOR LOADING AND UNLOADING TRUCK

The present application is a National Phase entry of PCT Application No. PCT/CN2016/108327, filed on Dec. 2, 2016, which claims the benefit of priority to Chinese patent application 201510954098.9 titled "RAILWAY WAGON FOR TRANSPORTING TRUCKS AND METHOD FOR LOADING AND UNLOADING TRUCK", filed with the Chinese State Intellectual Property Office on Dec. 17, 2015, which are incorporated herein by reference in their entireties.

FIELD

The present application relates to the technical field of railway transportation, and in particular to a railway wagon for transporting trucks and a method for loading and unloading trucks.

BACKGROUND

A long-distance transportation of commercial heavy-duty trucks is mainly by transported by roads and railways. In the road transportation, two trucks even three trucks supporting-transport mode is mostly adopted due to factors such as fuel consumption and work force consumption of the road transportation. That is, one truck transports one or two trucks. This transportation mode may cause an over-limit and over-load problem, which is not safe and may cause a traffic accident. Meanwhile, under the limit of the transportation mode, the losses of the trucks caused by the long-distance driving may be an unnegligible problem when the products are transported to the customer. In another aspect, since the railway transportation has dedicated transportation tracks, losses of trucks during the railway transportation may be omitted. In addition, the railway transportation is not affected by factors such as traffic jam. In this case, goods can be transported to a destination rapidly and on time. However, the shape and size of the commercial heavy-duty truck is substantially fixed, and the trucks may go beyond the gauge of the railway when being loaded on the existing railway wagon for transportation. Therefore, a piggyback transportation mode is mostly adopted, in which a truck full of goods is transported for a long distance by a dedicated railway vehicle on the railway. A piggyback flat car of the dedicated railway vehicle has features of low floor loading surface and large concentrated load bearing, and one railway wagon can be loaded with one truck.

Technique Problem

In view of the above, a railway wagon, capable of fully utilizing space, that a loading truck can be normally driven into and out of, and a method for loading and unloading trucks, are provided according to the present application.

Solutions for the Problem

Technique Solutions

In order to achieve the above object, following technical solutions are adopted according to the present application. A railway wagon for transporting trucks includes a running plate device mounted relatively at a middle portion between two side wall assemblies of the railway wagon, wherein, the running plate device includes a middle running plate device, two ends of the middle running plate device are respectively provided with end running plate devices, and an outer end of each of the end running plate devices is provided with a bridge plate device; the middle running plate device includes multiple middle running plate assemblies arranged side by side, each of the middle running plate assemblies includes a first running plate rotatably connected with the side wall assembly, and at least one first support plate rotatably connected with the side wall assembly is arranged below the first running plate; the end running plate device includes multiple end running plate assemblies arranged side by side, each of the end running plate assemblies include a second running plate rotatably connected with the side wall assembly, and at least one second support plate rotatably connected with the side wall assembly is arranged below the second running plate; and the bridge plate device includes a bridge plate, one end of the bridge plate is connected with the second running plate via a connection plate, the other end of the bridge plate is rotatably connected with an underframe assembly, and a bottom portion of the end of the bridge plate close to the connection plate is provided with a foldable support mechanism.

Two ends of the first running plate are each provided with a first pneumatic rod rotatably connected to the side wall assembly.

Two ends of the second running plate are each provided with a second pneumatic rod, a piston rod of the second pneumatic rod is rotatably connected to the side wall assembly, and a pressure tube of the second pneumatic rod is securely connected with the second running plate via a connection member.

A bottom portion of the bridge plate is provided with multiple third pneumatic rods rotatably connected with the underframe assembly.

The middle running plate assemblies located at the two ends of the middle running plate device are arranged tiltedly, and the middle running plate assemblies located at the middle of the middle running plate device are arranged horizontally.

The foldable support mechanism includes two supports both having a right-angled triangle shape, the two supports are arranged against each other and are rotatably connected with each other, and the two supports are respectively rotatably connected with the bridge plate and the underframe assembly.

A second connection plate is arranged between the end running plate assembly and the middle running plate assembly.

A method for loading and unloading trucks is provided.

The method for loading the trucks includes: step 1, placing horizontally the first running plate of each of the middle running plate assemblies and opening the first support plate to support and fix the first running plate, flipping down the second running plate of each of the end running plate assemblies to placing the second running plate horizontally and opening the second support plate to support and fix the second running plate, supporting the bridge plate device with the foldable support mechanism and connecting the bridge plate device with the second running plate via the connection plate; step 2, driving a first truck into the railway wagon from the bridge plate device at one end of the railway wagon to the bridge plate device at the other end of the railway wagon and stopping the first truck at the bridge plate device at the other end of the railway wagon, to fix the first truck; step 3, closing the first support plate of each of the middle running plate assemblies to place the first running plate vertically, closing the second support plate of each of the end running plate assemblies at one end of the railway wagon to place the second running plate in a flip-up manner, and folding the foldable support mechanism of the bridge plate device at one end of the railway wagon and opening the connection plate to placing the bridge plate device on the underframe assembly; step 4, driving a second truck into the railway wagon from the underframe assembly at one end of the railway wagon to the underframe assembly at the other end of the railway wagon close to a position below the bridge plate where the first truck is located, and securing the second truck; step 5, driving a third truck into the railway wagon from the underframe assembly at one end of the railway wagon to a position close to the second truck, and securing the third truck; step 6, flipping the second running plate of each of the end running plate assemblies close to one end of the railway wagon down to place horizontally the second running plate, and opening the second support plate to support and secure the second running plate, supporting the bridge plate device close to one end of the railway wagon with the foldable support mechanism and connecting the bridge plate device with the second running plate via the connection plate; and step 7, driving a fourth truck into the railway wagon from the bridge plate device over the third truck and stopping and securing the fourth truck at the bridge plate device.

The method for unloading the trucks includes: step 1, releasing the first truck and driving the first truck out of the bridge plate device at the other end of the railway wagon; step 2, closing the second support plate of each of the end running plate assemblies at the other end of the railway wagon, to place the second running plate in a flip-up manner, folding the foldable support mechanism of the bridge plate device at the other end of the railway wagon and opening the connection plate, to place the bridge plate device on the underframe assembly; step 3, releasing the second truck and driving the second truck from the underframe assembly at the other end of the railway wagon; step 4, releasing the third truck and driving the third truck from the underframe assembly at the other end of the railway wagon; step 5, placing horizontally the first running plate of each of the middle running plate assemblies and opening the first support plate to support the first running plate, flipping down the second running plate of each of the end running plate assemblies at the other end of the railway wagon to place the second running plate horizontally and opening the second support plate to support and secure the second running plate, supporting the bridge plate device at the other end of the railway wagon with the foldable support mechanism and connecting the bridge plate device with the second running plate via the connection plate; and step 6, releasing the fourth truck and driving the fourth truck out of the bridge plate device at the other end of the railway wagon.

Benefits of the Application

Benefits

The present application has the following advantages due to the above technical solutions. 1, according to the present application, the device is relatively mounted at the middle portion between two side wall assemblies of the railway wagon, inner space of the railway wagon is reasonably utilized, thereby increasing the number of trucks loaded into the wagon and improving the transportation efficiency. 2, according to the present application, the middle running plate assembly, the end running plate assembly and the bridge plate device each have a foldable structure, in this case, an upper layer truck may passes the running plates when the running plates are in a horizontal placed state, and an occupation on the inner space of the railway wagon may be reduced and a truck on the underframe assembly passes the running plates when the running plates are in a non-horizontal state. 3, according to the present application, the steel middle running plate assembly, end running plate assembly and bridge plate are each provided with a pneumatic rod which provides an additional power output for a rotation of the running plate, thereby reducing the work strength of the loading workers and improving the loading and unloading efficiency; in the case that the middle running plate assembly and the end running plate assembly are made of aluminum alloy, the weight of the boards are reduced and no pneumatic rod may be provided. 4, with the devices according to the present application, the truck to be transported may not exceed the gauge of the wagon when being loaded and can be normally driven into and out of the railway wagon.

BRIEF DESCRIPTION OF THE DRAWINGS

Description of the Drawings

Below, the present application is described in detail in conjunction with the drawings. It should be understood that, the drawings are only for better understanding of the present application and should not be understood to limit the present application.

Figure 1:
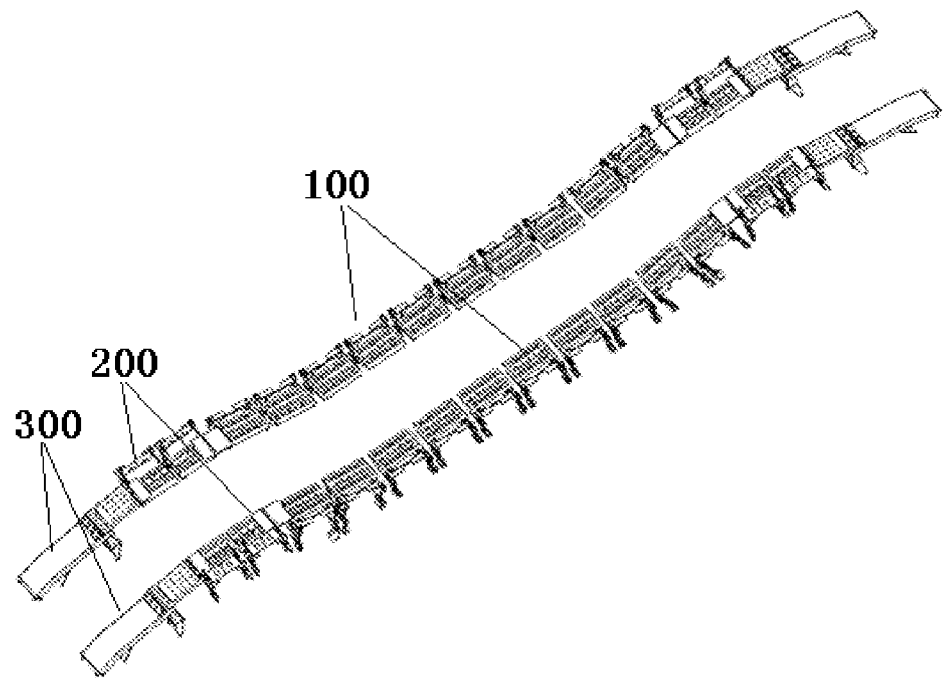
Figure 2:
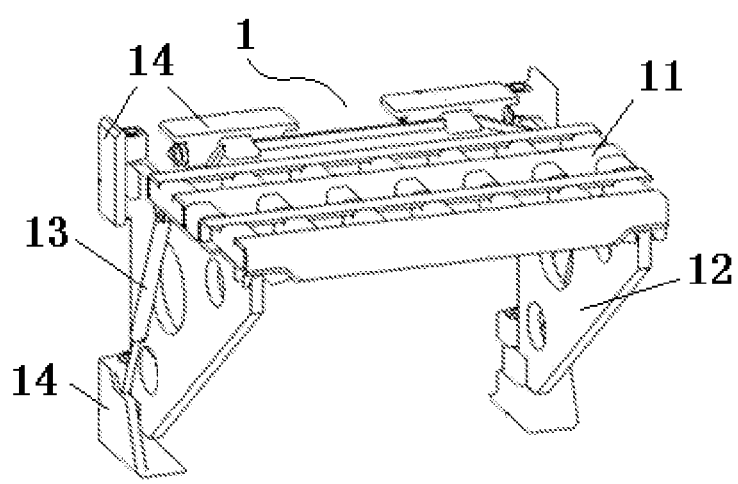
Figure 3:
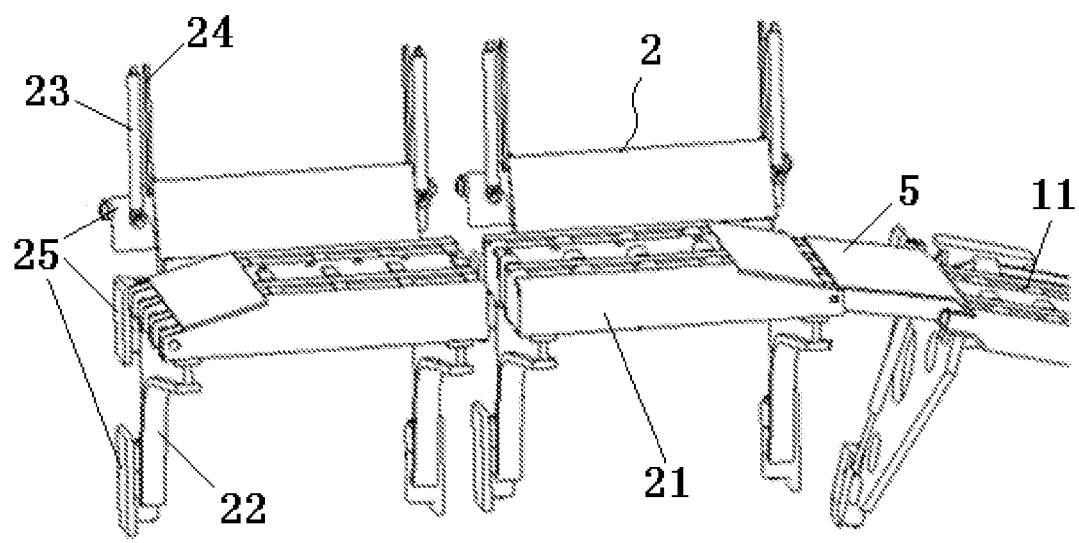
Figure 4:
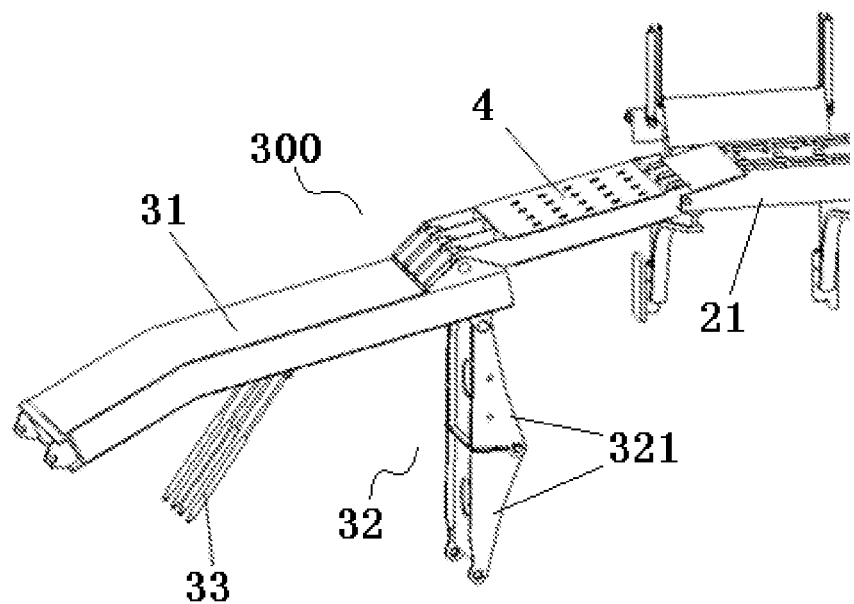
Figure 5:
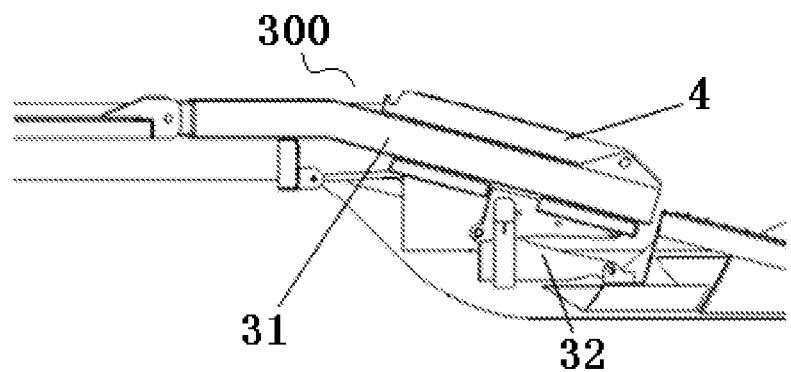
Figure 6:
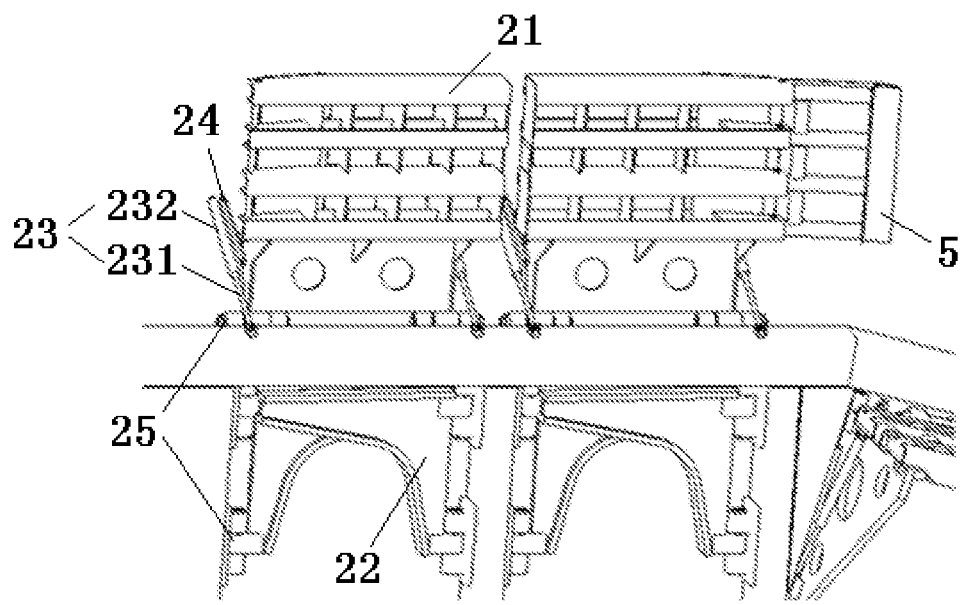
Figure 7:
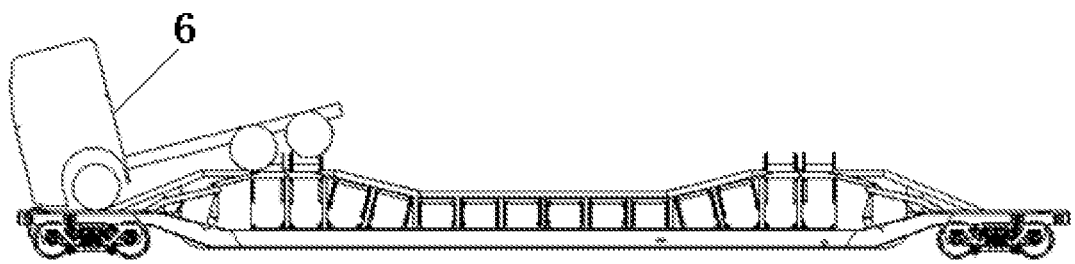
Figure 8:
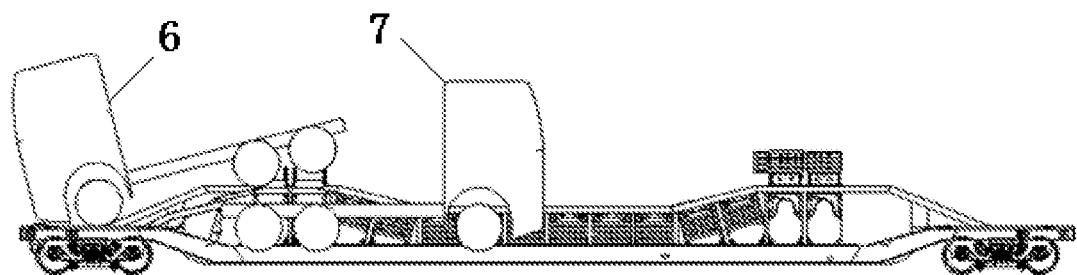
Figure 9:
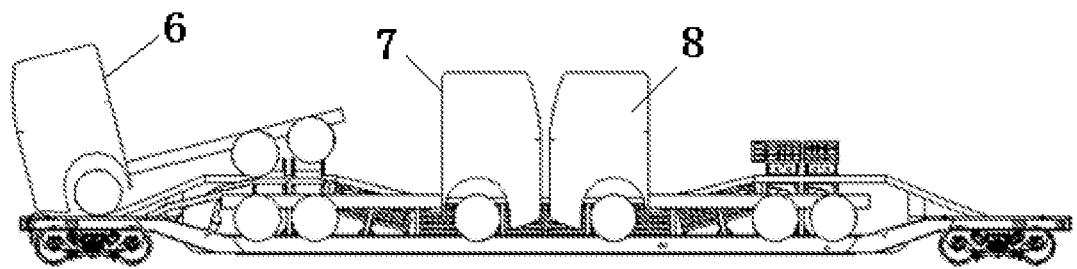
Figure 10:
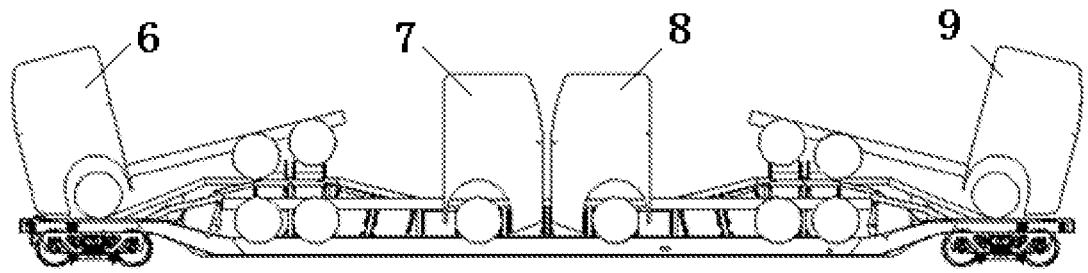

FIG. 1 is a schematic diagram of an entire structure according to the present application;

FIG. 2 is a schematic structural diagram of a middle running plate assembly according to the present application;

FIG. 3 is a schematic structural diagram of an end running plate assembly according to the present application;

FIG. 4 is a schematic structural diagram of a bridge plate device according to the present application;

FIG. 5 is a schematic diagram of a non-working position state of a bridge plate device according to the present application;

FIG. 6 is a schematic diagram of a non-working position state of an end running plate assembly according to the present application;

FIG. 7 is a schematic diagram showing a loading of a first truck according to the present application;

FIG. 8 is a schematic diagram showing a loading of a second truck according to the present application;

FIG. 9 is a schematic diagram showing a loading of a third truck according to the present application; and FIG. 10 is a schematic diagram showing a loading of a fourth truck according to the present application.

EMBODIMENTS OF INVENTION

Embodiments of the Present Application

Hereinafter, the present application is described in detail in conjunction with the drawings and embodiments.

As shown in FIG. 1, the present application includes a running plate device mounted relatively at a middle portion between two side wall assemblies of a railway wagon. The running plate device includes a middle running plate device 100. Two ends of the middle running plate device 100 are respectively provided with an end running plate device 200, and an outer ends of the end running plate device 200 is provided with a bridge plate device 300.

The middle running plate device 100 includes multiple middle running assemblies 1 arranged side by side. As shown in FIG. 2, each of the middle running plate assemblies 1 includes a rectangular running plate 11 rotatably connected with an side wall assembly via an axle seat 14. Two support plates 12 rotatably connected with the side wall assembly via the axle seat 14 are arranged and spaced below the running plate 11, and the two support plates 12 together support the running plate 11, so as to maintain the running plate 11 being placed horizontally.

The end running plate device 200 includes multiple end running plate assembly 2 arranged side by side. As shown in FIG. 3, each of the end running assembly 2 includes a rectangular running plate 21 rotatably connected with the side wall assembly via an axle seat 25. Two support plates 22 rotatably connected with the side wall assembly via the axle seat 25 are arranged and spaced below the running plate 21, and the two support plates 22 together support the running plate 21, so as to maintain the running plate 21 being placed horizontally.

As shown in FIG. 4, the bridge plate device 300 includes a bridge plate 31. One end of the bridge plate 31 is connected with the running plate 21 via a connection plate 4, and the other end of the bridge plate 31 is rotatably connected with an underframe assembly. The bottom of the end of the bridge plate 31 close to the connection plate 4 is provided with a foldable support mechanism 32 for placing the bridge plate device 300 in a non-working state on the underframe assembly (as shown in FIG. 5), thereby facilitating truck being loaded and unloaded.

In the above embodiment, two end of the running plate 11 are each provided with a pneumatic rod 13 rotatably connected with the side wall assembly. The pneumatic rod 13 can provide additional output power when the running plate 11 is rotated. The running plate may be made of steel or aluminum alloy. No pneumatic rod 13 may be provided when the running plate is made of aluminum alloy.

In the above embodiment, the middle running assembly 1 located at the end portion of the middle running plate device 100 may be arranged tiltedly, and the middle running plate assembly 1 located at the middle portion of the middle running plate device 100 may be arranged horizontally. In this way, a recess structure is formed in the middle running plate device 100, thereby avoiding an interference between the truck and the middle running plate assembly 1 during a loading and unloading.

In the above embodiment, two ends of the running plate 21 are each provided with a pneumatic rod 23, and a piston rod 231 of the pneumatic rod 23 is rotatably connected with the side wall assembly. A pressure tube 23 of the pneumatic rod 23 is connected with the running plate 21 via a connection member 24. In this case, when the pneumatic rod 23 extends, the pressure tube 23 may drive the running plate 21 to rotate upwards (as shown in FIG. 6). The running plate 21 may be made of steel or aluminum alloy. No pneumatic rod 23 may be provided when the running plate 21 is made of aluminum alloy.

In the above embodiment, the bottom of the bridge plate 31 is provided with multiple pneumatic rods 33 rotatably connected with the underframe assembly.

In the above embodiment, the foldable support mechanism 32 includes two supports 321 both having a right-angled triangle shape. The two supports 321 are arranged against to each other and rotatably connected with each other. Ends of the two supports 321 that are opposite to a joint connected to each other are respectively rotatably connected with the bridge plate 31 and the underframe assembly, thereby achieving a folding of the foldable support mechanism 32.

In the above embodiment, a connection plate 5 may be arranged between the end running plate assembly 2 and the middle running plate assembly 1.

In the above embodiment, the number of the middle running plate assemblies 1 is ten, the number of the end running plate assemblies 2 is eight, and four bridge plate devices 300 are provided.

A method for loading trucks is further provided according to the present application. As shown in FIGS. 7 to 10, the method includes steps 1 to 7.

In step 1, the running plate 11 of each of the middle running plate assemblies 1 is placed horizontally and the support plate 12 is opened to support and secure the running plate 11, the running plate 21 of each of the end running plate assemblies 2 is flipped down and placed horizontally and the support plate 22 is opened to support and secure the running plate 21, and each of the bridge plate devices 300 is supported with the foldable support mechanism 32 and is connected with the running plate 21 via the connection plate 4.

In step 2, a first truck 6 is driven into the railway wagon from the bridge plate device 300 at one end of the railway wagon to the bridge plate device 300 at the other end of the railway wagon and is stopped, and then, the first truck 6 is secured.

In step 3, the support plate 12 of each of the middle running plate assemblies 1 is closed to place the running plate 11 vertically, and the support plate 22 of each of the end running plate assemblies 2 at one end of the railway wagon to place the running plate 21 in a flip-up manner, and the foldable support mechanism 32 of the bridge plate device 300 at one end of the railway wagon is folded and the connection plate 4 is opened to place the bridge plate device 300 on the underframe assembly.

In step 4, a second truck 7 is driven into the railway wagon from the underframe assembly at one end of the railway wagon to the underframe assembly at the other end of the railway wagon and close to a position below the bridge plate device 300 where the first truck 6 is located, and the second truck 7 is secured.

In step 5, a third truck is driven into the railway wagon from the underframe assembly at one end of the railway wagon to a position close to the second truck 7, and is secured.

In step 6, the running plate 21 of each of the end running plate assemblies 2 close to one end of the railway wagon is flipped down to place the running plate 21 horizontally, and the support plate 22 is opened to support and secure the running plate 21. The bridge plate device 300 close to one end of the railway wagon is supported with the foldable support mechanism 32 and is connected with the running plate 21 via the connection plate 4.

In step 7, a fourth truck 9 is driven into the railway wagon from the bridge plate device 300 over the third truck 8 and is stopped and secured at the bridge plate device 300.

A method for unloading trucks is further provided according to the present application. The method includes steps 1 to 6.

In step 1, the first truck 6 is released and driven out of the bridge plate device 300 at the other end of the railway wagon.

In step 2, the support plate 22 of each of the end running plate assemblies 2 at the other end of the railway wagon is closed to place the running plate 21 in a flip-up manner, the foldable support mechanism 32 of the bridge plate device 300 at the other end of the railway wagon is folded and the connection plate is opened to place the bridge plate device 300 on the underframe assembly.

In step 3, the second truck 7 is released and driven out of the underframe assembly at the other end of the railway wagon.

In step 4, the third truck 8 is released and driven out of the underframe assembly at the other end of the railway wagon.

In step 5, the running plate 11 of each of the middle running plate assemblies 1 is placed horizontally and the support plate 12 is opened to support and secure the running plate 11, the running plate 21 of each of the end running plate assemblies 2 at the other end of the railway wagon is flipped down and placed horizontally and the support plate 22 is opened to support and secure the running plate 22. The bridge plate device 300 at the other end of the railway wagon is supported with the foldable support mechanism 32 and is connected with the running plate 21 via the connection plate 4.

In step 6, the fourth truck is released and driven out of the bridge plate device 300 at the other end of the railway wagon.

The above embodiments are only for illustrating the present application. The structures of the components, the connection modes and the like in the embodiments are changeable, and any equivalent and improvement made based on the technical solutions of the present application should not be excluded from the scope of protection of the present application.

The above embodiments are only for further illustrating the objectives, technical solutions and benefits of the present application in detail, and are not intended to limit the present application. Any modification, equivalent and improvement made without departing from the spirit and principle of the present application should fall within the scope of protection of the present application.

The invention claimed is:

1. A railway wagon for transporting trucks, comprising:
a running plate device mounted relatively at a middle portion between two side wall assemblies of the railway wagon,
wherein the running plate device comprises a middle running plate device, two ends of the middle running plate device are each provided with an end running plate device, and an outer end of the end running plate device is provided with a bridge plate device;
the middle running plate device comprises a plurality of middle running plate assemblies arranged side by side, each of the middle running plate assemblies comprises a first running plate rotatably connected with one of said side wall assemblies, and at least one first support plate rotatably connected with the side wall assembly is arranged below the first running plate;
the end running plate device comprises a plurality of end running plate assemblies arranged side by side, each of the end running plate assemblies comprises a second running plate rotatably connected with the side wall assembly, and at least one second support plate rotatably connected with the side wall assembly is arranged below the second running plate; and
the bridge plate device comprises a bridge plate, one end of the bridge plate is connected with the second running plate via a connection plate, the other end of the bridge plate is rotatably connected with an underframe assembly, and a bottom portion of the end of the bridge plate close to the connection plate is provided with a foldable support mechanism.

2. The railway wagon for transporting trucks according to claim 1, wherein two ends of the first running plate are each provided with a first pneumatic rod rotatably connected to the side wall assembly.

3. The railway wagon for transporting trucks according to claim 1, wherein two ends of the second running plate are each provided with a pneumatic rod, a piston rod of the second pneumatic rod is rotatably connected to the side wall assembly, and a pressure tube of the second pneumatic rod is securely connected with the second running plate via a connection member.

4. The railway wagon for transporting trucks according to claim 1, wherein a bottom portion of the bridge plate is provided with a plurality of pneumatic rods rotatably connected with the underframe assembly.

5. The railway wagon for transporting trucks according to claim 1, wherein ones of the middle running plate assemblies located at the two ends of the middle running plate device are arranged tiltedly, and ones of the middle running plate assemblies located at the middle of the middle running plate device are arranged horizontally.

6. The railway wagon for transporting trucks according to claim 1, wherein the foldable support mechanism comprises two supports both having a right-angled triangle shape, the two supports are arranged against each other and are rotatably connected with each other, and the two supports are respectively rotatably connected with the bridge plate and the underframe assembly.

7. The railway wagon for transporting trucks according to claim 1, wherein a second connection plate is arranged between one of the end running plate assemblies and one of the middle running plate assemblies.

8. A method for loading and unloading trucks based on the railway wagon according to claim 1, wherein
the method for loading the trucks comprising:
step 1, placing horizontally the first running plate of each of the middle running plate assemblies and opening the first support plate to support and secure the first running plate, flipping down the second running plate of each of the end running plate assemblies to place the second running plate horizontally and opening the second support plate to support and secure the second running plate, supporting the bridge plate device with the foldable support mechanism and connecting the bridge plate device with the second running plate via the connection plate;
step 2, driving a first truck from the bridge plate device at one end of the railway wagon to the bridge plate device at the other end of the railway wagon and stopping the first truck at the bridge plate device at the other end of the railway wagon, and securing the first truck;
step 3, closing the first support plate of each of the middle running plate assemblies to place the first running plate vertically, closing the second support plate of each of the end running plate assemblies at one end of the railway wagon to place the second running plate in a flip-up manner, and folding the foldable support mechanism of the bridge plate device at one end of the railway wagon and opening the connection plate to place the bridge plate device on the underframe assembly;
step 4, driving a second truck into the railway wagon from the underframe assembly at one end of the railway wagon to the underframe assembly at the other end of the railway wagon close to a position below the bridge plate where the first truck is located, and securing the second truck;

step 5, driving a third truck into the railway wagon from the underframe assembly at one end of the railway wagon to a position close to the second truck, and securing the third truck;

step 6, flipping the second running plate of each of the end running plate assemblies close to one end of the railway wagon down to place horizontally the second running plate, and opening the second support plate to support and secure the second running plate, supporting the bridge plate device close to one end of the railway wagon with the foldable support mechanism and connecting the bridge plate device with the second running plate via the connection plate; and step 7, driving a fourth truck into the railway wagon from the bridge plate device over the third truck and stopping and securing the fourth truck at the bridge plate device; and the method for unloading the trucks comprising:

step 1, releasing the first truck and driving the first truck out of the bridge plate device at the other end of the railway wagon;

step 2, closing the second support plate of each of the end running plate assemblies at the other end of the railway wagon to place the second running plate in a flip-up manner, folding the foldable support mechanism of the bridge plate device at the other end of the railway wagon and opening the connection plate to place the bridge plate device on the underframe assembly;

step 3, releasing the second truck and driving the second truck from the underframe assembly at the other end of the railway wagon;

step 4, releasing the third truck and driving the third truck from the underframe assembly at the other end of the railway wagon;

step 5, placing horizontally the first running plate of each of the middle running plate assemblies and opening the first support plate to support the first running plate, flipping down the second running plate of each of the end running plate assemblies at the other end of the railway wagon to place the second running plate horizontally and opening the second support plate to support and secure the second running plate, supporting the bridge plate device at the other end of the railway wagon with the foldable support mechanism and connecting the bridge plate device with the second running plate via the connection plate; and step 6, releasing the fourth truck and driving the fourth truck out of the bridge plate device at the other end of the railway wagon.

9. The railway wagon for transporting trucks according to claim 2, wherein two ends of the second running plate are each provided with a second pneumatic rod, a piston rod of the second pneumatic rod is rotatably connected to the side wall assembly, and a pressure tube of the second pneumatic rod is securely connected with the second running plate via a connection member.

10. The railway wagon for transporting trucks according to claim 2, wherein a bottom portion of the bridge plate is provided with a plurality of pneumatic rods rotatably connected with the underframe assembly.

11. The railway wagon for transporting trucks according to claim 2, wherein ones of the middle running plate assemblies located at the two ends of the middle running plate device are arranged tiltedly, and ones of the middle running plate assemblies located at the middle of the middle running plate device are arranged horizontally.

12. The railway wagon for transporting trucks according to claim 2, wherein the foldable support mechanism comprises two supports both having a right-angled triangle shape, the two supports are arranged against each other and are rotatably connected with each other, and the two supports are respectively rotatably connected with the bridge plate and the underframe assembly.

13. The railway wagon for transporting trucks according to claim 2, wherein a second connection plate is arranged between one of the end running plate assemblies and one of the middle running plate assemblies.

\* \* \* \* \*